United States Patent
Strobel

[11] Patent Number: 6,004,126
[45] Date of Patent: Dec. 21, 1999

[54] APPARATUS FOR MANUFACTURING BELL AND SPIGOT PIPE MOLDINGS

[76] Inventor: Klaus Strobel, Pfaffenleither 17, D-95100 Selb, Germany

[21] Appl. No.: 09/073,547

[22] Filed: May 6, 1998

Related U.S. Application Data

[62] Division of application No. 08/770,873, Dec. 20, 1996, Pat. No. 5,779,966.

[30] Foreign Application Priority Data

Dec. 20, 1995 [DE] Germany .......................... 195 47 775

[51] Int. Cl.$^6$ .............. A01J 21/00; A01J 25/12
[52] U.S. Cl. .............. 425/405.2; 425/812; 425/DIG. 44
[58] Field of Search .............. 425/405.2, 405.1, 425/DIG. 44, 812

[56] References Cited

U.S. PATENT DOCUMENTS

| | | | |
|---|---|---|---|
| 2,865,079 | 12/1958 | Marchioli et al. | 264/314 |
| 3,193,900 | 7/1965 | Wendt | 264/314 |
| 3,239,591 | 3/1966 | Wendt | 264/314 |
| 3,561,079 | 2/1971 | Anderson | 425/405.2 |
| 3,907,949 | 9/1975 | Carlson | 425/DIG. 12 |
| 4,888,144 | 12/1989 | Matsushita et al. | 425/405.1 |
| 4,937,025 | 6/1990 | Foster et al. | 425/405.1 |

*Primary Examiner*—Harold Pyon
*Assistant Examiner*—Thukhanh Nguyen
*Attorney, Agent, or Firm*—Herbert L. Lerner; Laurence A. Greenberg

[57] ABSTRACT

Particularly large-size bell and spigot pipes of ceramic molding material are isostatically pressed within a hollow-cylindrical pressure pot with a molding cavity for the molding compound. An inner core is axially extractable and an elastomeric diaphragm is disposed concentrically around the inner core. The diaphragm is clamped in place at its end face and there is defined between the pressure pot and the diaphragm a chamber which communicates with a source of hydraulic pressure. The inner core is provided with a molding ring on which the bell region of the bell and spigot pipe is formed. The molding ring has a reduced-diameter end region and thus defines two end faces. The two end faces are concentric but axially spaced apart. At least the upper end face of the molding ring is provided with a surface coating of elastic plastic material. An annular gap is defined between the end region of the molding ring and the inner core which, depending on the hydraulic pressure in the cavity, opens and closes a vent port which communicates with the molding cavity. Microcracks in the bell region of the molding can be safely avoided.

8 Claims, 4 Drawing Sheets

APPARATUS FOR MANUFACTURING BELL AND SPIGOT PIPE MOLDINGS

This application is a divisional of application Ser. No. 08/770,873 filed Dec. 20, 1996, now U.S. Pat. No. 5,779, 966.

BACKGROUND OF THE INVENTION

1. Field of the Invention

The invention relates to an apparatus and a method of manufacturing bell and spigot pipe moldings from a ceramic molding compound by isostatic pressing, in which within a hollow-cylindrical pressure pot a molding cavity for the molding compound to be pressed is provided between an inner core extractable axially and an elastomeric diaphragm arranged concentrically to the latter, the diaphragm being clamped in place at the face end and defining with the pressure pot a pressure chamber exposed to a source of hydraulic pressure, the inner core being provided with a molding ring forming the bell region of the bell and spigot pipe, the molding ring comprising an end region reduced in diameter for forming two face end surface areas which are concentric but spaced away from each other axially.

2. Description of the Related Art

An apparatus of the foregoing kind is known from U.S. Pat. No. 3,193,900. That apparatus described therein is used in the isostatic pressing of bell and spigot pipe moldings. The prior art apparatus comprises a hollow-cylindrical tubular body, a molding cavity, a pressurizable elastomeric diaphragm and at its face end a steel insert for forming the bell region. In that apparatus, the bell region of the molding is produced by an annular steel insert. In the bell region, more particularly at the shoulder of the bell region, microcracks may occur during isostatic pressing due to the large differences in wall thickness.

There has become known from German patent DE 28 25 611 C2 (K. Strobel) an apparatus for isostatic pressing tongue and groove pipes. That apparatus comprises an inner core with a ring at the bottom end and a pressurized diaphragm. Annular inserts of a rubber or plastics material are provided for forming the tongue and groove of the pipe moldings. The purpose of the annular inserts is to transmit the pressure exerted by the elastomeric diaphragm into a wedge of the molding cavity which is not directly exposed to the elastomeric diaphragm. The result is that the molding compound located in the recess neighboring the inner core for forming a tongue is sufficiently compacted by the pressing process.

There has become known from German patent publication DE 44 07 299 C1 (K. Strobel et al.) a further apparatus for isostatically pressing tongue and groove pipes. Steel rings are provided in that apparatus as the shaping elements.

SUMMARY OF THE INVENTION

It is accordingly an object of the invention to provide a method and a device for manufacturing bell and spigot pipe moldings, which overcome the above-mentioned disadvantages of the heretofore-known devices and methods of this general type and in which no cracks result in the bell region of the isostatically pressed molding.

With the foregoing and other objects in view there is provided, in accordance with the invention, an apparatus for manufacturing bell and spigot pipe moldings from a ceramic molding compound by isostatic pressing, comprising:

a hollow-cylindrical pressure pot, an axially removable inner core disposed within the pressure pot and an elastomeric diaphragm concentrically surrounding the inner core, the diaphragm and the inner core defining a molding cavity therebetween, the inner core being formed with a vent port communicating with the molding cavity;

the pressure pat and the diaphragm defining a pressure chamber therebetween which is connectible with a hydraulic pressure source;

a molding ring disposed on the inner core, the molding ring defining a bell region of a bell and spigot pipe to be molded in the molding cavity, the molding ring having a reduced diameter end region defining two concentric, but axially spaced apart, end faces, at least one of the end faces being provided with a surface of elastic plastic material; and the end region of the molding ring and the inner core defining an annular gap therebetween which causes the vent port in the inner core to selectively open and close in dependence on a pressing force.

In other words, at least one of the end faces of the molding ring is provided with a surface of an elastic plastic material. Despite its flexibility, the elastic plastic material, which is preferably a high-molecular plastic, has a molding effect during isostatic pressing. Accordingly, the risk of cracking the bell region is greatly reduced in the bell and spigot molding pressed in an apparatus in accordance with the invention. The apparatus in accordance with the invention is particularly suitable for manufacturing bell and spigot pipe moldings of approximately 100 to 1,500 mm in diameter. Furthermore, venting of the molding cavity is provided for in which, depending on the pressing force, an annular gap defined between the end region of the molding ring and the inner core is opened.

In accordance with an added feature of the invention, the end region of the molding ring features a coating of an elastic plastic material. Since not only the face end surface areas of the molding ring but also the end region in its entirety features a coating of an elastic plastic material the risk of cracks forming in the bell and spigot pipe moldings is further reduced.

In accordance with an additional feature of the invention, the end region of the molding ring is configured with a sleeve of an elastic plastic material. In addition to reducing the risk of cracking the end region of the molding ring in this aspect according to the invention can be adapted to other shapes by simply replacing the sleeve of elastic plastic material. In addition, there is no need to replace the complete molding ring when the plastic material begins to wear. Instead, one need only insert a new sleeve.

In accordance with yet a further feature of the invention, the elastomeric diaphragm comprises a region adjoining the molding ring.

In accordance with again an additional feature of the invention, the inner core is tubular and it comprises at least one vent port communicating with the molding cavity. By this, a pressure compensation between the inner core and the molding cavity is made possible which likewise contributes towards improving the pressing quality of the bell and spigot molding.

With the above and other features in view, there is also provided, in accordance with the invention, a method in which the molding compound in the bell region of the molding ring is pressed against the surface of elastic plastic material provided at least on the upper end face of the molding ring, the end region of the molding ring defined by the inner core an annular gap which during pressing releases or closes at least one vent port communicating with the molding cavity, depending on the pressure existing in the molding cavity.

Other features which are considered as characteristic for the invention are set forth in the appended claims.

Although the invention is illustrated and described herein as a method and device for manufacturing bell and spigot pipe moldings, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
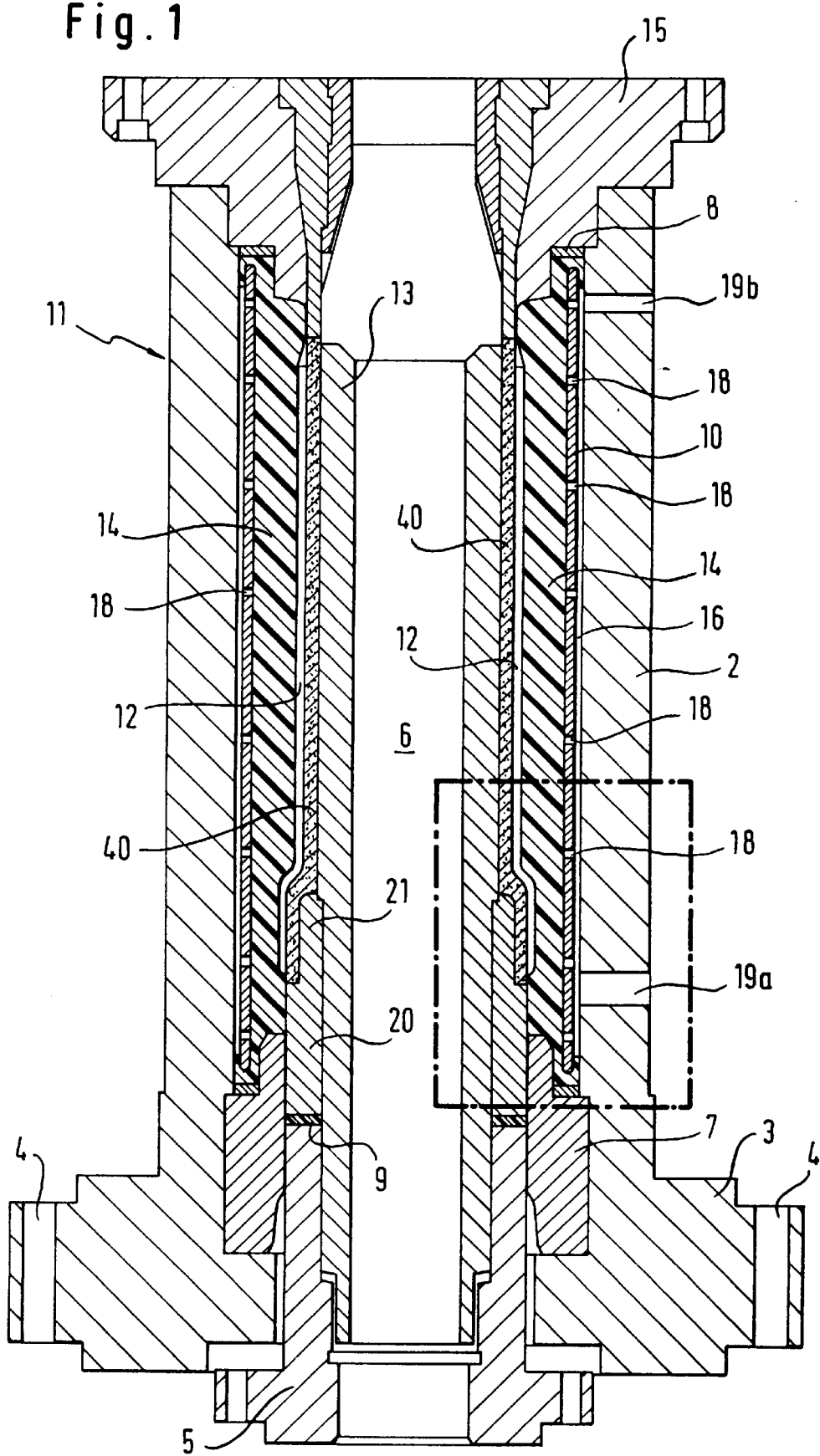
FIG. 1 is a sectional view of the most essential components of a pressing apparatus in accordance with the present invention.

Referring now to the figures of the drawing in detail and first, particularly, to FIG. 1 thereof, there is seen a somewhat simplified representation of an inventive apparatus for manufacturing a bell and spigot molding. The apparatus includes a substantially hollow-cylindrical pressure pot 11, the lower region 3 of which is widened. The widened region 3 features vertical tappings 4 serving to attach the apparatus, for instance, on a non-illustrated support base. An axially removable inner core 13 is provided within the interior of the pressure pot 11 and it extends coaxially therewith. In the exemplary embodiment shown in FIG. 1, the inner core 13 can be lowered together with a lower ram 5 on which it is supported. The lower ram 5 may for example be configured as a nut into which the inner core 13 is screwed by a male thread provided in its lower region.

An upper ram 15 is provided at the upper termination of the cylindrical mold outer wall 2. The upper ram 15 can be lowered onto the pressure pot 11.

An elastomeric diaphragm 14 is concentrically disposed between the pressure pot 11 and the inner core 13. The diaphragm 14 is supported by means of diaphragm mounts 7, 8. Together with the inner core 13 the elastomeric diaphragm 14 encloses a molding cavity 12, in the lower region of which a molding ring 20 is inserted which is seated on the lower ram 5 via an interposed spacer 9. The molding ring 20 comprises an end region 21 of reduced diameter which—in the embodiment of FIG. 1—is located at the top. The end region 21 defines two concentric end faces 22a, 22b (cf. also FIGS. 2 to 4) which are axially spaced from each other.

The elastomeric diaphragm 14 and the pressure pot 11 together define a pressure chamber 16. A cylindrical insert 10 is provided in the pressure chamber 16 which seats the elastomeric diaphragm 14 and which is formed with a plurality of radial bores 18. The pressure chamber 16 is subjected to pressure by means of a non-illustrated hydraulic pressure source. Radial bores 19 are formed in the pressure pot 11 for pressurizing the pressure chamber 16. The lower radial bores 19a shown in FIG. 1 serve to supply hydraulic fluid and the upper radial bore 19b serves the discharge hydraulic fluid. The elastomeric diaphragm 14 is subjected to pressure via the radial bores 18 of the insert 10. The diaphragm 14 is thus deflected in the direction of the inner core 13 and compresses and compacts the molding compound filled into the molding cavity 12 so that a bell and spigot molding 40 materializes.

Figure 2:
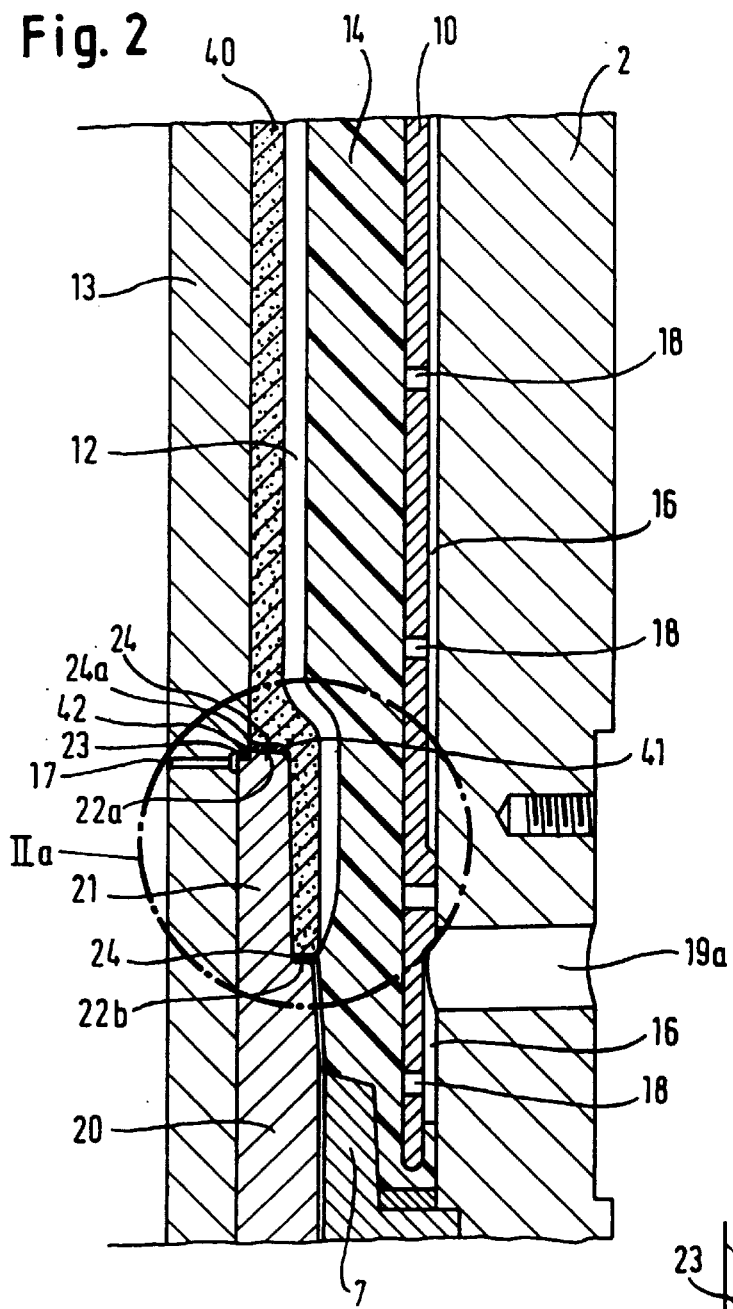
FIG. 2 is an enlarged view of a detail of FIG. 1, showing a first embodiment of a molding ring in accordance with the invention.

FIGS. 1 and 2 show the apparatus of the invention after isostatic pressing, i.e., the elastomeric diaphragm 14 is in its non-pressurized resting position and the press-formation of the bell and spigot molding 40 in the molding cavity 12 is finished. The bell and spigot molding 40 is removed from the hollow-cylindrical pressure pot 11 by lower in the inner core 13 together with the lower ram 5 and the molding ring 20 resting thereon.

For a more-detailed explanation of the molding ring 20 in accordance with the invention a detail corresponding to the dot-dashed section of FIG. 1 is shown magnified in FIG. 2. It should be noted that the same elements therein are denoted by the same reference numerals.

As illustrated in the enlarged view of FIG. 2, the end region 21 of the molding ring 20 is reduced in diameter. As a result of the reduced diameter of the end region 21 two concentric face end faces 22a, 22b are formed which are axially spaced from each other. In the exemplary embodiment shown, namely with the lowerable inner core 13, the end faces 22a and 22b serve as standing surfaces for the bell and spigot molding 40. In accordance with the invention, at least the upper end face 22a of the molding ring 20 comprises in the region of the shoulder 41 of the bell and spigot molding 40 a surface 24 of an elastic plastic material. In the exemplary embodiment shown in FIG. 2, both concentric end faces 22a, 22b comprise surfaces 24 of an elastic plastic material.

The elastic plastic material for the end faces 22 of the molding ring 20 is a high-molecular plastic material, for example polyamide 6.6.

The upper end region of the molding ring 20 is provided with a stepped raised face 23 at the inner diameter of the molding ring 20. The raised face 23 rests on an assigned edge of the inner core 13. The raised face 23 features a horizontal supporting surface area which is formed with radial grooves 23a offset around the circumference. The inner core 13 is formed with a radial vent port 17, extending substantially at the same level as the radial grooves 23a.

Figure 2A:
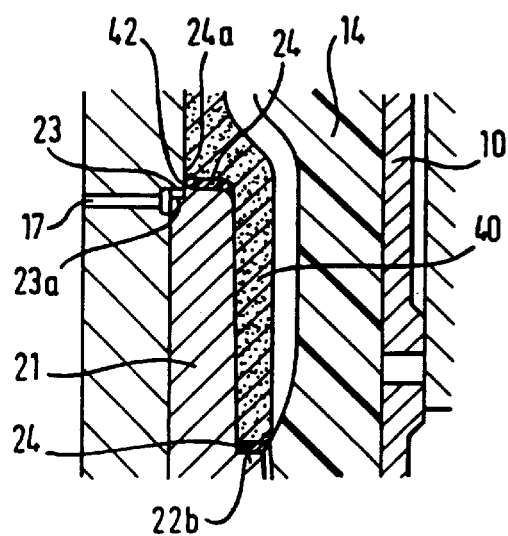
FIG. 2a is an enlarged view of the detail IIa of in FIG. 2.

Referring now more specifically to FIG. 2a, the elastic surface 24 of the upper face end surface areas 22a of the molding ring 20 is formed at the inner diameter with a lip-shaped raised face 24a. In the fitted condition the upper end region of the molding ring 20 defines by the inner core 13 an annular gap 42 which communicates with the radial vent port 17. In this arrangement the gap width of the annular gap 42 depends on the pressing force existing in the molding cavity 12. Depending on the pressing force in the molding cavity 12 the annular gap 42 is opened or closed so that the pressure on the inner core side acting on the molding 40 can be compensated.

Figure 3:
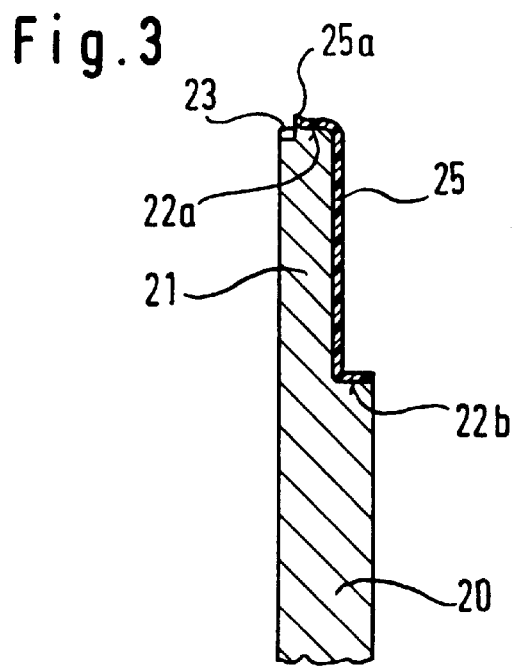
FIG. 3 is a partial sectional view of a second embodiment of the molding ring in accordance with the invention.

FIG. 3 shows in a view corresponding to that of FIG. 2 of a further exemplary embodiment of the invention. The end region 21 of the molding ring 20 is reduced in diameter and comprises a coating 25 of an elastic plastic material. Accordingly, the complete end region 21 forming the bell region of the bell and spigot molding 40 consists of an elastic plastic material so that the risk of cracks forming is still further reduced. In his variant too, the elastic coating 25 in the region of the top end face 22a is provided with a lip-shaped raised face 25a.

Figure 4:
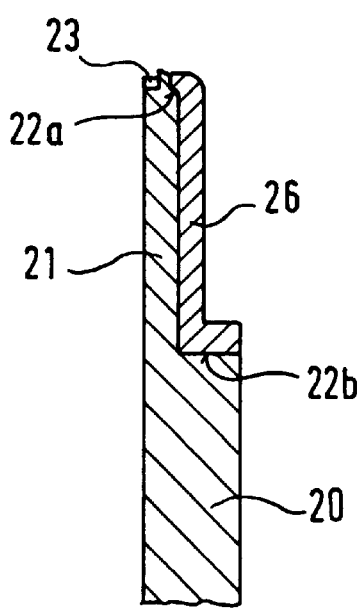
FIG. 4 is a partial sectional view of a third embodiment of the molding ring in accordance with the invention.

A third exemplary embodiment of a molding ring 20 in accordance with the invention is shown in FIG. 4. Here, the end region 21 of the molding ring 20 is formed with a sleeve 26 of an elastic plastic material. In this arrangement the sleeve 26 may be simply placed on the end region 21 of the molding ring 20 and advantageously, where needed, replaced with a new one when the sleeve 26 is worn out or when some other shape is needed in the bell region, for example.

Figure 5:
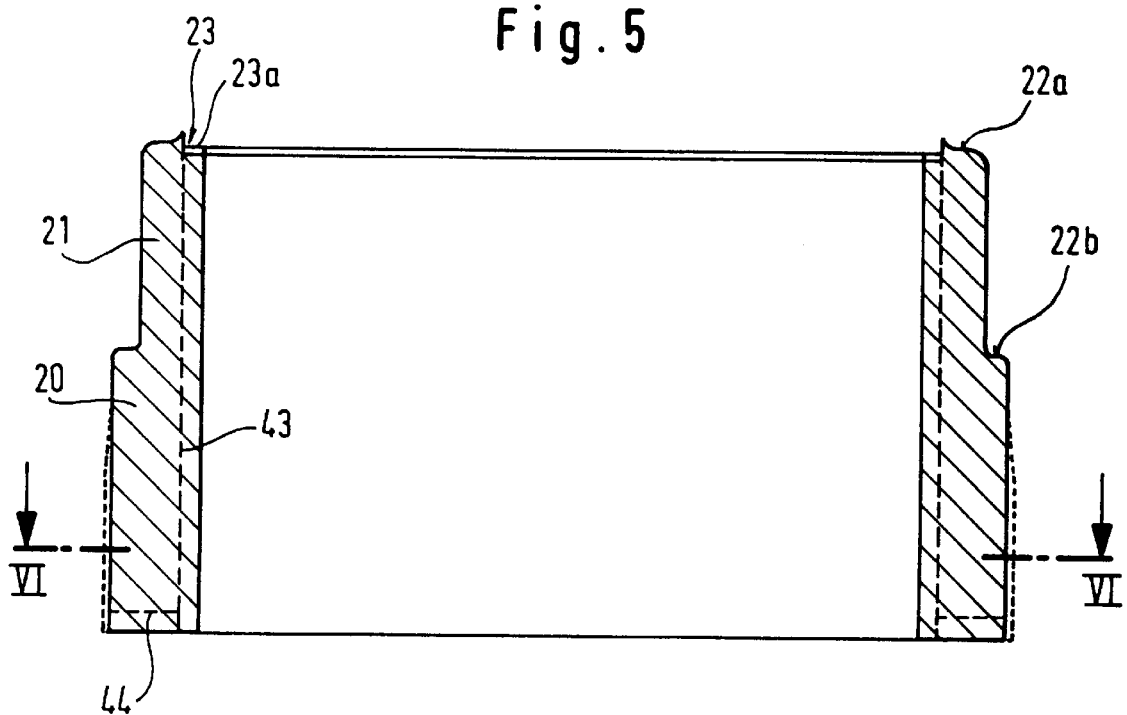
FIG. 5 is a schematic sectional view of a fourth embodiment of the molding ring in accordance with the invention.

FIG. 5 shows a section through a fourth exemplary embodiment of a molding ring 20 having, in accordance with the invention, an end region 21 reduced in diameter for forming two concentric, but axially spaced apart, end faces 22a, 22b. In this case, the complete molding ring 20 consists of an elastic plastic material. Radial grooves 23a are formed on the horizontal supporting surface area at the raised face 23. The radial grooves 23a are assigned axial grooves 43 oriented on the inner diameter of the molding ring 20. At the bottom end of the molding ring 20, the axial grooves 43 translate into radial grooves 44. Accordingly, in this exemplary embodiment venting of the molding cavity 12 is effected via the annular gap formed between the molding ring 20 and the inner core 13, the radial grooves 23a, the axial grooves 43, and the radial grooves 44.

Figure 6:
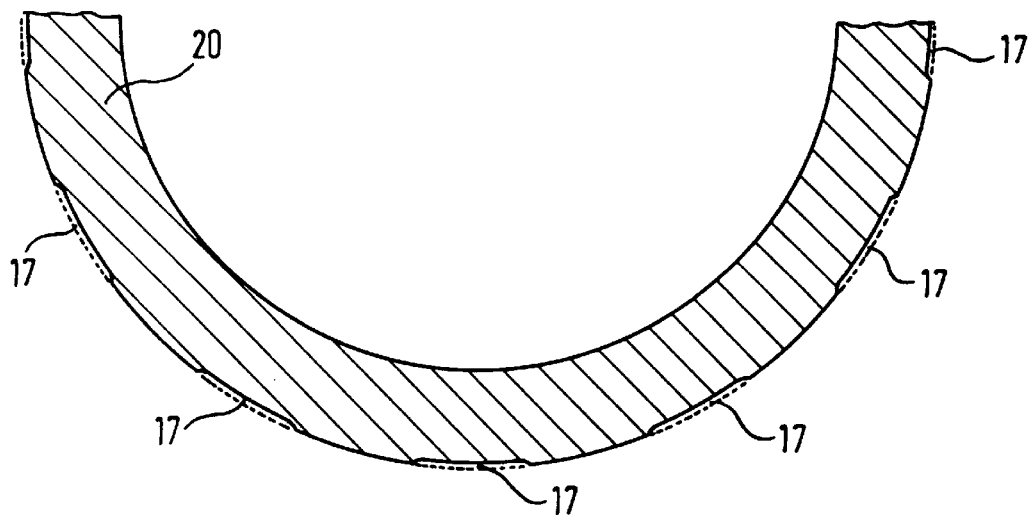
FIG. 6 is a partial sectional view of the molding ring taken along the line VI—VI in FIG. 5.

FIG. 6 is a plan view of half the molding ring 20 of FIG. 5 as seen along the section line VI—VI. For even better venting of the molding cavity 12 the molding ring 20 comprises along its outer diameter an axial system of vent grooves 17. The vent grooves 17 are regularly spaced axial depressions in the outer molding surface and they are distributed about the circumference of the ring. The outer shell surface area of the molding ring 20 is depicted in dotted lines where the flats are located (see also FIG. 5). Due to the axial arrangement of the vent grooves 17 the molding cavity 12 is ventable following isostatic pressing.

The exemplary embodiment illustrated in FIGS. 5 and 6 is the currently preferred best mode embodiment of the invention.

The function of the above-described apparatus will now be explained in the following. First, with the upper ram removed, a suitable amount of the ceramic molding compound is inserted in the molding cavity 12. Then, the upper ram 15 is reconnected to-the pressure pot 11. The pressure chamber 16 is now pressurized with hydraulic fluid for isostatically pressing the molding 40. The fluid reaches the elastomeric diaphragm 14 via the radial bores 18 of the insert 10. The diaphragm is thus deflected in the direction of the inner core 13, as a result of which the molding compound is compressed, producing the bell and spigot pipe molding 40.

The isostatic pressing is effected in that the mold body is forced against the elastic surface 24 as shown in FIGS. 1, 2 and 2a. In the exemplary embodiment according to FIGS. 3, 4 and 5 pressing occurs in the entire sleeve region against an elastic surface.

The molding cavity 12 is vented during pressing Venting is effected via the annular gap 42 which is defined in the region of the raised face 23 by the end region 21 of the molding ring 20 and the inner core 13. Venting of the molding cavity 12 occurs via the annular gap 42 irrespective of the pressing force.

As a result of the aforementioned means no microcracks occur in the region of the shoulder 41 of the bell and spigot molding 40 which would otherwise materialize when the molding is fired.

I claim:

1. An apparatus for manufacturing bell and spigot pipe molding from a ceramic molding compound by isostatic pressing, comprising:

a hollow-cylindrical pressure pot, an axially removable inner core disposed within said pressure pot and an elastomeric diaphragm concentrically surrounding said inner core, said diaphragm and said inner core defining a molding cavity therebetween, said inner core being formed with a vent port communicating with said molding cavity;

said pressure pot and said diaphragm defining a pressure chamber therebetween which is connectible with a hydraulic pressure source;

a molding ring disposed on said inner core, said molding ring defining a bell region of a bell and spigot pipe to be molded in said molding cavity, said molding ring having a reduced diameter end region defining two concentric, but axially spaced apart, end faces, at least one of said end faces being provided with a surface of elastic plastic material; and said end region of said molding ring and said inner core defining an annular gap therebetween which causes said vent port in said inner core to selectively open and close in dependence on a pressing force.

2. The apparatus according to claim 1, wherein said end region of said molding ring carries a coating of an elastic plastic material.

3. The apparatus according to claim 1, wherein said molding ring is formed of elastic plastic material.

4. The apparatus according to claim 1, including a sleeve of elastic plastic material formed on said end region of said molding ring.

5. The apparatus according to claim 1, wherein said elastomeric diaphragm has a region abutting said molding ring.

6. The apparatus according to claim 1, wherein said inner core is a tube.

7. The apparatus according to claim 1, wherein said molding ring has. axially oriented vent grooves formed therein.

8. The apparatus according to claim 1, wherein said elastic plastic material is a high-molecular plastic.

* * * * *